April 24, 1945. R. HOEFNER 2,374,432
LATERAL SHIFT MOWER
Filed Sept. 14, 1943 2 Sheets-Sheet 1
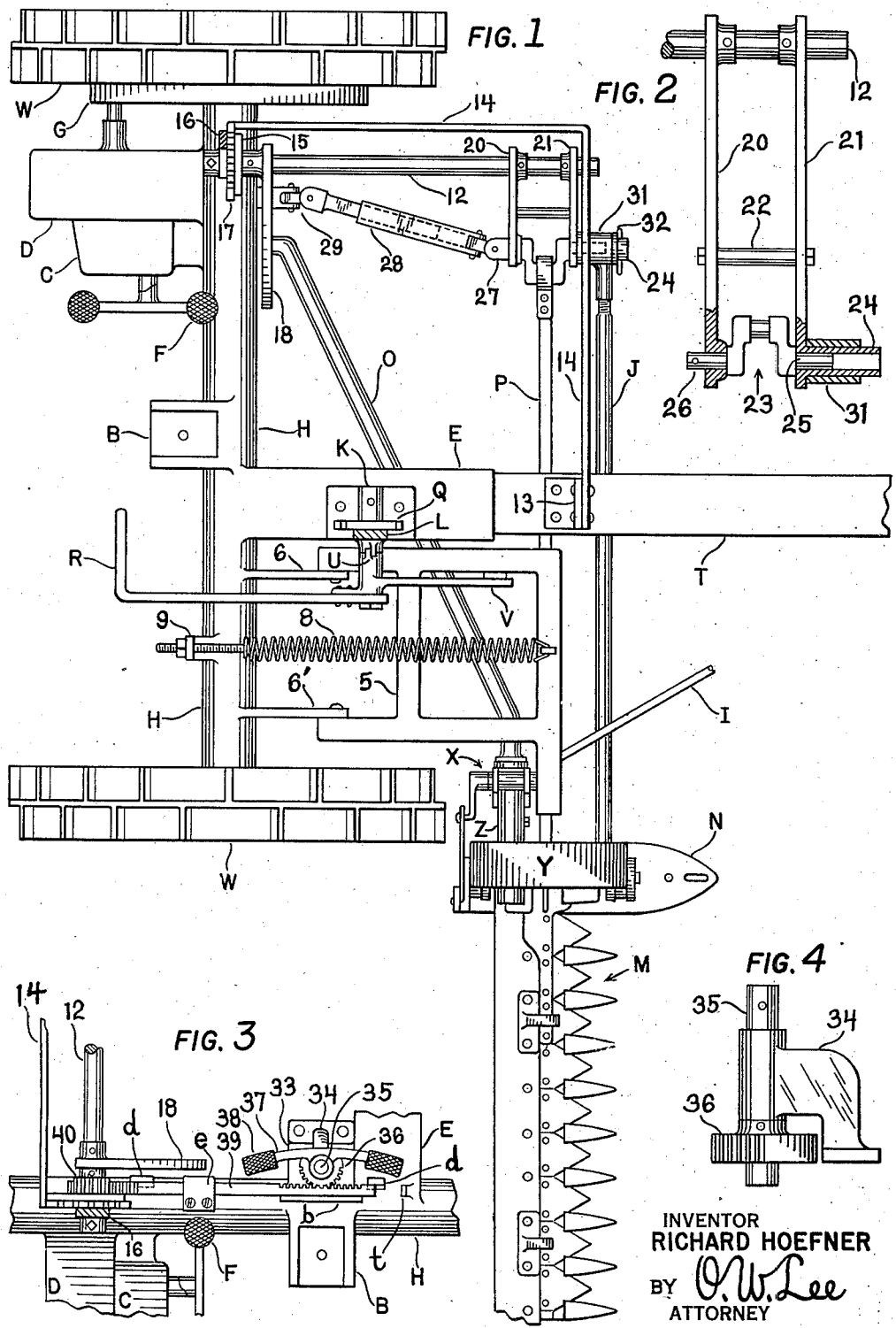
INVENTOR
RICHARD HOEFNER
BY O. W. Lee
ATTORNEY April 24, 1945. R. HOEFNER 2,374,432
LATERAL SHIFT MOWER
Filed Sept. 14, 1943 2 Sheets-Sheet 2

INVENTOR
RICHARD HOEFNER
BY O.W. Lee
ATTORNEY

Patented Apr. 24, 1945

2,374,432

UNITED STATES PATENT OFFICE 2,374,432

LATERAL SHIFT MOWER

Richard Hoefner, Spokane, Wash.

Application September 14, 1943, Serial No. 502,265

6 Claims. (Cl. 56—272)

The present invention relates to certain new and useful improvements in a lateral shift mower and provides facilities for the operator to quickly shift the cutter bar in and out a substantial distance during operation, so as to thereby cut an irregular swath while driving straight ahead.

This lateral shifting of the cutter bar enables the operator to cut under fences and quickly retract the cutter bar at each fence post. This is of particular advantage in cutting weeds along fences, because otherwise the weeds between the fence posts are left uncut, or else they must be cut by hand, with great waste of time and effort. If left uncut they go to seed and make it impossible to control weed growth along fences and for considerable distance on each side thereof.

The invention is also of particular advantage in cutting weeds along highways, where various obstructions such as small trees, bushes, telephone poles, highway signs etc. are encountered in the path of the cutter bar, and consequently present considerable difficulty in steering the team so as to avoid these various obstructions. With the present invention, the cutter bar can be laterally shifted so as to avoid such obstructions while driving the team straight ahead, thus saving time and effort and accomplishing more complete cutting of weeds which would otherwise be unavoidably missed.

In like manner, the invention is particularly serviceable for cutting between trees in orchards, not only for weeds, but also for harvesting whatever cover crop that may be planted in the orchard.

The invention is applicable to various types of mowers which are in general use, and consist in slidably mounting the cutter bar on a hinged lifting frame which is raised by the usual lever commonly employed for raising the cutter bar direct; and the pitman drive and coupling bars for the cutter bar are swingingly mounted on arms carried by a rock shaft which is lever operated so as to laterally shift the entire cutting mechanism and thereby enable the operator to control the swath, as circumstances suggest and necessity requires.

The accompanying drawings show the invention applied a well known type of mower, and illustrate the nature and principle of the invention, which is equally applicable to various other types of mowers.

Fig. 1 is a plan view of the invention applied to a mower, parts being broken away for convenience of illustration.

Fig. 2 is an enlarged detail showing the manner of mounting the pitman crank shaft in the swinging arms for lateral shift movement.

Fig. 3 is a fragmentary plan view showing means for foot operation of the rock shaft of Fig. 1.

Fig. 4 is an enlarged detail of the manner of mounting the foot operated pinion of Fig. 3.

Figure 5:
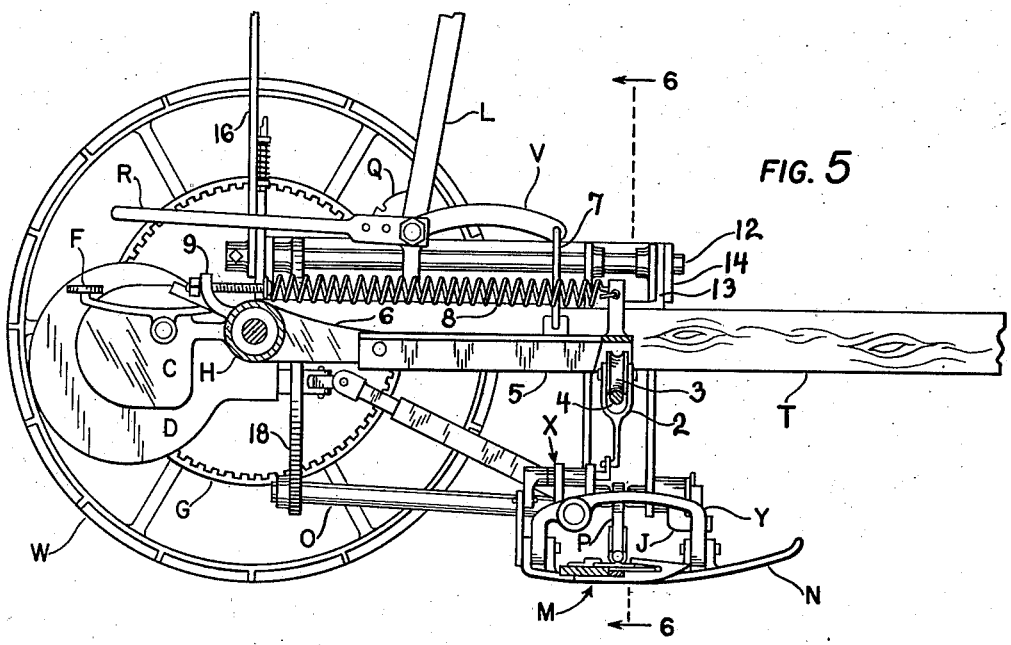
Fig. 5 is an end elevation of Fig. 1, the near wheel and other parts being broken away for clarity of illustration.

As shown in the drawings, the general construction of the mower is conventional and consists of the axle housing H supported by wheels W one of which is provided with an internal gear G which operates a drive gear mechanism enclosed within the housing D and controlled by a clutch within the housing C, foot pedal operation being provided as indicated at F, all of this structure being well known to those familiar with mowers.

The axle housing H has a forwardly extending pole frame E to which the pole or tongue T is attached, and a rearwardly extending bracket B is provided for the attachment of the seat S. A bracket K with a notched sector Q is mounted on this pole frame E and this bracket carries a stub shaft upon which the lift lever L and foot lever R are fulcrumed, these two levers having engaging lugs as indicated at U, a lifting arm V being operated by these levers, all of which is conventional practice.

The cutter bar is collectively indicated at M and is secured to the shoe N which is hinged to the yoke Y which is provided with a bearing Z upon which there is a bearing bracket with a crank lift device as collectively indicated at X, all of which is well known conventional practice.

In the prior art practices, this crank lift X is connected by a link to the aforesaid arm V, but in the present invention this crank lift X is connected to a hanger 2 in which there is mounted a roller 3 which travels on a track 4 so as to afford lateral movement of the cutter bar M and the parts connected thereto. This track 4 is supported by a frame 5 which is hinged to brackets 6—6 carried by the axle housing H as shown in Fig. 1 and Fig. 5. A link 7 connects this frame 5 to the aforesaid lifting arm V, so that operation of the foot lever R or lift lever L will raise the cutter bar in the required manner. A lifting spring 8 is connected between the front of the hinged frame 5 and a bracket 9 carried by the axle housing H, as best seen in Fig. 1 and Fig. 5, any suitable take-up device being provided for tensioning the spring according to requirements.

The aforesaid lateral movement of the cutter bar is provided by mounting a rockshaft 12 in a frame 14 which is secured to a bracket 13 on the tongue T and to a bracket 15 on the axle housing H, as best seen in Fig. 1. This rockshaft is operated by a lever 16 which is here shown with a latch cooperating with a notched sector 17 which is carried by the frame 14. Secured to this rockshaft 12 is an arcuate arm 18 in which the rear end of the conventional drag bar O is pivoted, and the opposite end of this drag bar is journaled in the bearing Z carried by the yoke Y of the cutter bar. Paired arms 20—21 are also secured to this rockshaft 12, and the arm 21 carries a sleeve bearing 24 as shown in Fig. 2. Journaled upon this sleeve bearing 24 is a bearing head 31 into which the conventional brace bar J is threaded in the manner shown in Fig. 1. The opposite end of this brace bar J is connected to the aforesaid yoke Y in the conventional manner, usually by a ball and socket joint. In this manner there is provided the conventional A-frame for the cutter bar, and the entire assembly is laterally shiftable by operating the rockshaft 12.

The pitman crankshaft 23 is journaled in the lower ends of the paired arms 20—21 in the manner shown in Fig. 2 where it will be seen that the outer journal 25 is mounted within the aforesaid sleeve bearing 24, and the inner journal 26 extends a short distance through the arm 20 so as to provide for attachment of the lower universal joint 27 which is preferably pinned thereto. This universal joint is connected to a telescopic drive coupling 28 which is provided with an upper universal joint 29 for connection to the usual drive for the pitman. This telescopic drive coupling may be a square shaft slidably mounted in a square sleeve, or these parts may be slidably splined together in any well known manner. If desired, this telescopic drive coupling may be supplanted by a suitable length of drive cable, so as to eliminate the need for the illustrated universal joints.

In Fig. 1 a washer and pin 32 are used to hold the bearing head 31 in place upon the sleeve bearing 24. As shown in Fig. 2 a tie rod 22 is employed to rigidly connect the arms 20—21 together in spaced relation.

Figure 6:
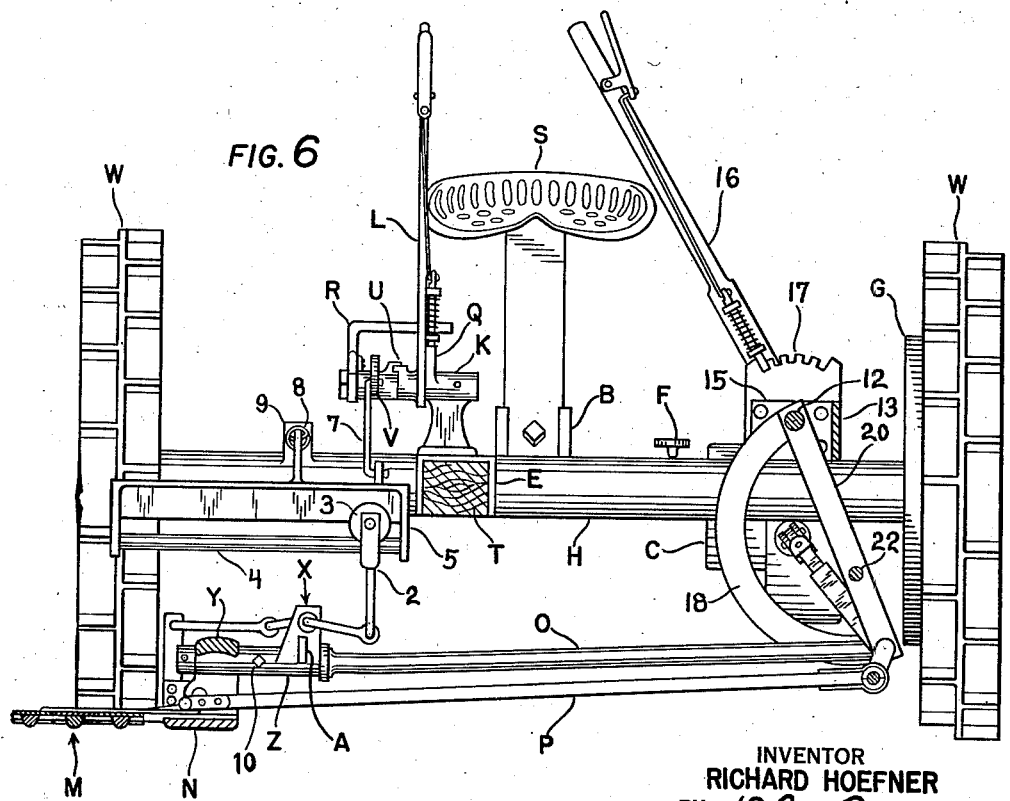
Fig. 6 is a front view partly in section taken along the line 6—6 of Fig. 5.

As best seen in Fig. 6 the arcuate arm 18 enables the rockshaft 12 to be located either to the right or left of the pitman drive and still afford clearance during the swinging movements. This is of advantage since some mowers have the pitman drive at a different distance from the wheel than others.

From the foregoing description it will be seen that the cutter bar assembly is supported by the roller 3 which travels upon the track 4 carried by the frame 5, and the entire assembly is held in floating relation by the spring 8. It will also be seen that the lever 16 can be used to bodily move the entire cutter bar assembly laterally so as to position the shoe N either inside or outside the wheel, and thus cut an irregular swath while driving straight ahead; and when the mower is to be used for normal cutting, the lever 16 can be latched to the notched sector 17 so as to position the shoe N in the usual position.

The illustrated lever 16 is fully sufficient for efficient operation; however, if desired it may be either supplemented or else supplanted by foot pedal operation, in the manner shown in Fig. 3.

As shown in Fig. 3, a base plate 33 forms a web between the axle housing H and the tongue frame E. The axle housing H is provided with guide bearings such as d—d—b, and a rack bar 39 is slidably mounted in these guide bearings and retained in place by one or more keeper plates such as e. The left end of this rack bar 39 has teeth on its upper face, and there is secured to the aforesaid rockshaft 12, a pinion 40 which meshes with the teeth on this end of the rack bar 39. The opposite end of this rack bar has teeth on its front face as here illustrated, and a pinion 36 meshes with these teeth. As best seen in Fig. 4, this pinion 36 is secured to an upright shaft 35 which is journaled in an upright bearing bracket 34. This bearing bracket 34 is secured to the aforesaid base plate 33 which is preferably bored to receive the lower end of the shaft 35. A pair of oppositely extending lever arms 37 are secured to the upper end of this shaft 35, and the outer ends of these lever arms are provided with suitable pedal grips 38. From this description, it will be seen that the operator can place his feet on the pedal grips 38 and actuate the rack bar 39 to operate the rockshaft in either direction at will. This foot operation may be used to supplement the previously described lever 16, and if desired, its hand grip may be tied down so as to hold the latch free of the notched sector and afford alert operation of these foot pedals with greater promptness. If desired, the lever 16 may be omitted so as to operate the rockshaft by the foot pedals alone, in which case the frame 14 can serve as a stop for one end of the rack bar and a suitable stop t may be provided for the other end of the rack bar, so as to limit the extent of movement in each direction.

The operation of the lateral shift device will be readily apparent to those familiar with mowers, and it will be understood that for cutting weeds, the usual grass board and stick are unnecessary and are removed so as not to interfere with cutting around obstructions. With but little practice an operator will soon become adept and can cut surprisingly near to an obstruction before retracting the cutter bar, and then quickly shift to the original line of cut as soon as the obstruction is passed. The time interval required for shifting in each direction is so short that the operator can readily judge the critical moment in accordance with the rate of travel of the team.

It will be seen that the present invention provides a simple and efficient construction for a lateral shift mower, and that the disclosed improvements can readily be attached to various mowers already in use, or else embodied as a part of mowers at the time of manufacture. Whatever modifications that may be necessary to accommodate the differences in manufacturing practices of various types of mowers, can readily be accomplished by the skill of the mechanic, and the pitman can be driven in any suitable manner that may seem most advisable for the particular type of mower to which the invention is applied. The present disclosure is intended as a practical example and not in a limiting sense.

It is conventional practice to provide lever action to rock the bearing Z for the purpose of tilting the cutter bar, but in the present instance this lever is omitted and the cutter bar is held at set inclination by the setscrew 10 shown in Fig. 6. Other means may be employed for this purpose, as will be readily apparent to any mechanic, In the present disclosure, I claim as my invention:

1. In a mower comprising a wheeled frame, a drive gearing and a cutter bar including a yoke; an auxiliary frame secured to the wheeled frame, a rockshaft journaled in said auxiliary frame, a downwardly extending arcuate arm secured to said rockshaft, a drag bar pivotally connecting said arcuate arm to the yoke of the cutter bar, a pair of pendent arms secured to the forward end of said rockshaft, a crankshaft journaled in the lower ends of said pendent arms, a pitman connected between said crankshaft and the cutter bar, a brace bar pivotally connected between one of said pendent arms and the yoke of the cutter bar, a lift frame hinged to the wheeled frame, a laterally extending track carried by said lift frame, a hanger having a roller mounted on said track, a link connection between said hanger and the cutter bar, a lift lever fulcrumed upon the wheeled frame, a link connecting said lift frame to said lever, a spring connected between said lift frame and the wheeled frame, means to operate said rockshaft to laterally shift the cutter bar relative to the wheeled frame, and a flexible drive connecting said crank shaft to the drive gearing.

2. In a mower comprising a wheeled frame, a drive gearing and a cutter bar including a yoke; a rockshaft journaled on the wheeled frame, a downwardly extending arcuate arm secured to said rockshaft, a bar pivotally connecting said arcuate arm to the yoke of the cutter bar, a pair of pendent arms secured to the forward end of said rockshaft, a crankshaft journaled in the lower ends of said pendent arms, a pitman connecting said crankshaft to the cutter bar, a brace bar pivotally connected between one of said pendent arms and the yoke of the cutter bar, a lift frame hinged to the wheeled frame, a laterally extending track carried by said lift frame, a roller mounted on said track and connected to the cutter bar, a lift lever fulcrumed upon the wheeled frame and operatively connected to said lift frame, a spring connected between said lift frame and the wheeled frame, means to operate said rockshaft to laterally shift the cutter bar relative to the wheeled frame, and a flexible drive connecting said crankshaft to the drive gearing.

3. In a mower comprising a wheeled frame, a drive gearing and a cutter bar including a yoke; a rockshaft journaled on the wheeled frame, pendent arms secured to said rockshaft, coupling bars pivotally connecting said pendent arms to the yoke of the cutter bar, a lift frame hinged to the wheeled frame, a laterally extending track carried by said lift frame, a roller mounted on said track and connected to the cutter bar, a lift lever fulcrumed upon the wheeled frame and operatively connected to said lift frame, means to operate said rockshaft to laterally shift the cutter bar relative to the wheeled frame, and a drive connection for operating the cutter bar.

4. A lateral shift mower comprising a main frame, a lift frame hinged to said main frame, a laterally extending track carried by said lift frame, a cutter bar slidably suspended from said track, a rockshaft journaled on said main frame, pendent arms secured to said rockshaft, coupling bars pivotally connecting said pendent arms to said cutter bar, means for operating said rockshaft to move said cutter bar along said track, drive means for operating said cutter bar, and means to raise said lift frame and the cutter bar carried thereby.

5. A lateral shift mower comprising a main frame, a lift frame hinged to said main frame, a laterally extending track carried by said lift frame, a cutter bar slidably suspended by said track, means to move said cutter bar along said track, drive means for operating said cutter bar, and means to raise said lift frame and the cutter bar carried thereby.

6. A lateral shift mower comprising a main frame, a lift frame hinged to said main frame, a laterally extending track carried by said lift frame, a cutter bar slidably suspended from said track, a rockshaft journaled on said main frame, pendent arms secured to said rockshaft, coupling bars pivotally connecting said pendent arms to said cutter bar, a pinion fixed to the rockshaft, a slidably mounted rack bar having horizontal teeth meshing with said pinion, vertical teeth on the opposite end of said rack bar, a rotatably mounted pinion meshing with said vertical teeth, foot pedals for operating the latter said pinion to reciprocate said rack bar and thereby actuate said rockshaft, drive means for operating said cutter bar, and means to raise said lift frame and the cutter bar carried thereby.

RICHARD HOEFNER.